(12) United States Patent
Bayer et al.

(10) Patent No.: US 12,233,935 B2
(45) Date of Patent: Feb. 25, 2025

(54) STEERING COLUMN FOR A MOTOR VEHICLE

(71) Applicants: thyssenkrupp Presta AG, Eschen (LI); thyssenkrupp AG, Essen (DE)

(72) Inventors: Tim Bayer, Luechingen (CH); Simon Blaettler, Grabs (CH); Daniel Kreutz, Feldkirch (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 625 days.

(21) Appl. No.: 17/612,360

(22) PCT Filed: May 18, 2020

(86) PCT No.: PCT/EP2020/063785
§ 371 (c)(1),
(2) Date: Nov. 18, 2021

(87) PCT Pub. No.: WO2020/234224
PCT Pub. Date: Nov. 26, 2020

(65) Prior Publication Data
US 2022/0242474 A1  Aug. 4, 2022

(30) Foreign Application Priority Data
May 22, 2019  (DE) ...................... 10 2019 207 525.8

(51) Int. Cl.
*B62D 1/181* (2006.01)
*B62D 1/183* (2006.01)
(Continued)

(52) U.S. Cl.
CPC ............. *B62D 1/185* (2013.01); *B62D 1/181* (2013.01); *B62D 1/183* (2013.01); *F16C 3/035* (2013.01);
(Continued)

(58) Field of Classification Search
CPC .......... B62D 1/18; B62D 1/181; B62D 1/183; B62D 1/185; B62D 1/187; B62D 1/189;
(Continued)

(56) References Cited

U.S. PATENT DOCUMENTS 3,521,341 A * 7/1970 Reinhard ............... F16M 11/28
29/434
4,805,478 A   2/1989 Beauch
(Continued)

FOREIGN PATENT DOCUMENTS

DE            35 13 340 A1    10/1986
DE       102015216326 A1 *    6/2016 ............. B62D 1/181
(Continued)

OTHER PUBLICATIONS

English Translation of International Search Report Issued in PCT/EP2020/063785 dated Aug. 14, 2020.
(Continued)

*Primary Examiner* — Keith J Frisby
(74) *Attorney, Agent, or Firm* — thyssenkrupp North America, LLC

(57) ABSTRACT

A steering column for a motor vehicle may include a casing unit in which a steering spindle is mounted rotatably about a longitudinal axis that extends in a longitudinal direction. The casing unit has at least two casing tubes that have a polygonal cross section and are guided such that they can be adjusted relative to one another in the longitudinal direction. Rolling bodies that have a rolling body radius are arranged between the casing tubes such that the rolling bodies can roll in the longitudinal direction in at least three raceways that are distributed circumferentially. To increase rigidity and improve compactness, center points of the rolling bodies are at a radial spacing that is less than or equal to the rolling body radius from an envelope circle that circumscribes the
(Continued)

casing tube, on which the rolling bodies can roll on the outside.

9 Claims, 4 Drawing Sheets

(51) Int. Cl.
    *B62D 1/185*         (2006.01)
    *F16C 3/035*         (2006.01)
    *F16C 29/04*         (2006.01)
    *F16D 3/06*          (2006.01)

(52) U.S. Cl.
    CPC ............ *F16C 29/048* (2013.01); *F16D 3/065* (2013.01); *F16C 2326/24* (2013.01)

(58) Field of Classification Search
    CPC .......... B62D 1/16; F16C 29/04; F16C 29/048; F16C 29/001; F16C 29/00; F16C 29/046; F16C 29/0697; F16C 2326/24; F16C 2220/42; F16C 2220/44; F16C 2233/00; F16C 33/588; F16C 33/58; F16C 33/64; F16C 3/035; F16C 3/03; F16D 3/065; F16D 3/06
    USPC .................................... 74/493, 492; 280/775
    See application file for complete search history.

(56) References Cited

U.S. PATENT DOCUMENTS

| | | | |
|---|---|---|---|
| 5,737,971 A | 4/1998 | Riefe et al. | |
| 2003/0209897 A1* | 11/2003 | Manwaring | B62D 1/184 |
| | | | 280/775 |
| 2015/0003770 A1 | 1/2015 | Bussit et al. | |
| 2016/0052536 A1 | 2/2016 | Nicolussi et al. | |
| 2017/0113710 A1* | 4/2017 | Matsuno | B62D 1/187 |
| 2017/0241472 A1 | 8/2017 | Walser | |
| 2017/0328400 A1 | 11/2017 | Muntener et al. | |
| 2018/0319420 A1 | 11/2018 | Huber et al. | |
| 2020/0331513 A1 | 10/2020 | Bayer et al. | |
| 2021/0197882 A1* | 7/2021 | Bayer | B62D 1/183 |

FOREIGN PATENT DOCUMENTS

| | | |
|---|---|---|
| DE | 10 2017 221 004 A1 | 5/2019 |
| JP | 2005351480 A | 12/2005 |
| WO | 2015/018781 A1 | 2/2015 |

OTHER PUBLICATIONS

Din En Iso 683-17, Heat-treated steels, alloy steels and free-cutting steels, Part 17: Ball and roller bearing steels (ISO 683-17:2014), Feb. 2015.

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2020/063785, filed May 18, 2020, which claims priority to German Patent Application No. DE 10 2019 207 525.8, filed May 22, 2019, the entire contents of both of which are incorporated herein by reference.

FIELD

The present disclosure generally relates to steering columns, including adjustable steering columns for motor vehicles.

BACKGROUND

A steering column for a motor vehicle has a steering shaft with a steering spindle, at the rear (in the driving direction) end of which, which faces the driver, a steering wheel for introducing a steering command by way of the driver is attached. The steering spindle is mounted rotatably in the casing unit of an actuating unit which is mounted on the vehicle body via a supporting unit which holds the casing unit. Adjustable steering columns make the adjusting of the actuating unit relative to the vehicle body possible.

It is known for the steering column to be designed such that it can be adjusted in the longitudinal direction, that is to say in the axial direction of the steering spindle, in order to adapt the steering wheel in an operating position for a comfortable steering intervention to the driver's position in manual driving operation. For autonomous driving when no manual steering intervention takes place, the steering column can have as great an adjusting path as possible in the longitudinal direction, with the result that the steering wheel can be moved by way of maximum telescoping in the longitudinal direction into a stowage position outside the operating position, in order to free up the vehicle interior compartment for some other use.

For the adjusting in the longitudinal direction, the casing unit has a telescopic arrangement of casing tubes. Single telescopic arrangements are known, in the case of which an inner casing tube dips into an outer casing tube. In particular, for the realization of great adjusting ratios, multiple telescopic arrangements are known, in the case of which one or more intermediate casing tubes is/are inserted in between. In order to achieve a smooth-running and low-play adjusting capability and in order for it to be possible in the process nevertheless for as high a flexural rigidity of the casing unit as possible to be produced, it is known for a linear roller bearing system to be provided between the casing tubes. U.S. Pat. No. 5,737,971 has disclosed, for example, a steering column of the generic type, in the case of which the casing unit has a total of four rolling body guides which lie opposite one another in pairs with regard to the longitudinal axis. In each case one channel-shaped or groove-shaped raceway is arranged on the outside on an inner casing tube for each of the rolling body guides, and in each case one channel-shaped or groove-shaped raceway is arranged on the inside on an outer casing tube so as to lie radially opposite the former. A plurality of balls which can roll on the raceways in the case of a relative adjustment of the casing tubes in the longitudinal direction are arranged in each case as rolling bodies in rows in the raceway cross section which is delimited between the raceways. A smooth-running and low-play adjustment can be realized by virtue of the fact that the rolling cross section which denotes the rolling body cross section in the rolling direction transversely with respect to the longitudinal axis is adapted to the raceway cross section with low tolerances.

The raceways are arranged on the connecting sides; these are the side faces of the casing tubes which are rectangular in cross section. Although the polygonal casing tubes inherently have a relatively high rigidity, only a limited rigidity can be realized for the entire casing unit for a given cross section of the casing tubes by virtue of the fact that the rolling body guides are arranged on the side faces which form the connecting sides. Moreover, the installation space requirement is relatively great.

Furthermore, it is necessary in the case of the known casing unit for the bearing play of the rolling bodies with respect to the raceways to be predefined in a relatively accurate manner with low tolerances close to zero, since a great bearing play reduces the rigidity, but an excessively low bearing play increases the adjusting force, which leads to an unacceptable stiff adjustment. In the case of the known steering column, the narrow tolerances which are to be maintained lead to a high manufacturing and assembly outlay.

Thus a need exists for an improved roller-mounted casing unit with increased rigidity and a compact overall design, along with improved functionality with a lower manufacturing outlay.

DETAILED DESCRIPTION

Figure 1:
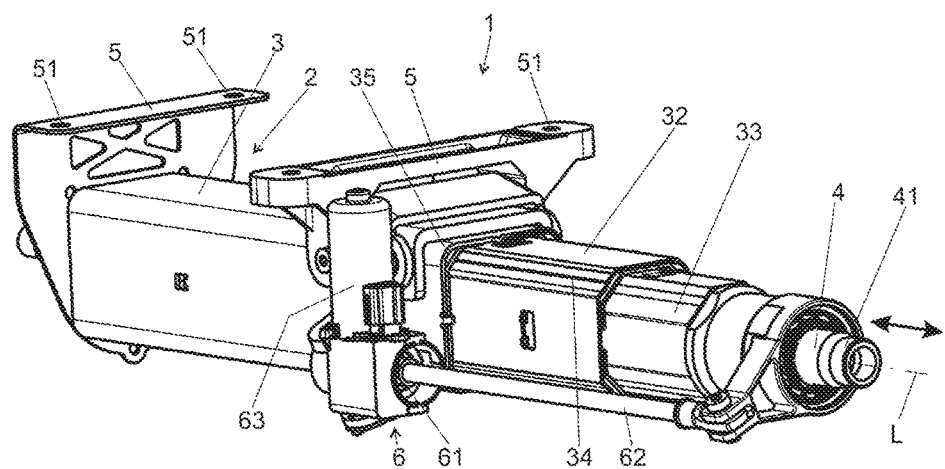
FIG. 1 is a diagrammatic perspective view of an example steering column.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art The present disclosure generally relates to a steering column for a motor vehicle. In some examples, a steering column may comprise a casing unit, in which a steering spindle is mounted such that it can be rotated about a longitudinal axis which runs in the longitudinal direction, and which casing unit has at least two casing tubes which have a polygonal cross section and are guided such that they can be adjusted relative to one another in the longitudinal direction, rolling bodies which have a rolling body radius being arranged between the casing tubes such that they can roll in the longitudinal direction in raceways, at least three raceways being arranged distributed over the circumference.

In the case of a steering column for a motor vehicle, comprising a casing unit, in which a steering spindle is mounted such that it can be rotated about a longitudinal axis which runs in the longitudinal direction, and which casing unit has at least two casing tubes which have a polygonal cross section and are guided such that they can be adjusted relative to one another in the longitudinal direction, rolling bodies which have a rolling body radius being arranged between the casing tubes such that they can roll in the longitudinal direction in raceways, at least three raceways being arranged distributed over the circumference, it is proposed according to the invention that the center points of the rolling bodies which can roll radially on the outside on a casing tube are at a radial spacing which is smaller than or equal to the rolling body radius from an envelope circle which circumscribes the casing tube, on which the rolling bodies can roll on the outside.

The rolling body is preferably configured as a ball or as a cylindrical roller.

A polygonal cross section has a multiple-edge or multiple-limb basic shape, said basic shape differing from a circular cylindrical shape. It is not necessary here that the corners are formed by non-differentiable points, but rather they can also be rounded. Greatly rounded cross-sectional profiles, such as a cloverleaf-like profile, also have a polygonal cross section.

The invention specifies an optimized configuration and arrangement of the rolling body guides in the case of polygonal casing tubes which preferably have a triangular, rectangular, hexagonal or octagonal cross section. Here, an optimized ratio of the rolling body radius which corresponds to half the rolling body diameter and specifies the rolling radius to the diameter of the envelope circle of a casing tube which has raceways on its outer side is specified.

The envelope circle of the casing tube denotes the circle with the smallest possible radius, the envelope circle radius, which encloses the polygonal outer cross section of the casing tube, the corners making contact with the envelope circle at at least three points. The cross section is preferably oriented symmetrically with respect to the longitudinal axis, with the result that the envelope circle can preferably lie concentrically with respect to the longitudinal axis.

According to the invention, the rolling bodies are arranged with their center points within an optimum region which is circularly annular in cross section and the inner radius of which corresponds to the difference of the envelope circle radius and the rolling body radius, and the outer radius of which is given by the sum of the envelope circle radius and the rolling body radius.

By virtue of the fact that the envelope circle is defined clearly for a given cross section of a casing tube, the rolling body guides can be configured with a higher rigidity in a manner which is dependent on the rolling body radius, improved utilization of the available installation space which is as a rule scarce in the motor vehicle being made possible by way of the compact overall design.

The center points can preferably lie outside the envelope circle. A larger free raceway cross section is made possible radially between the raceways as a result. A larger cross section of the casing tube can be selected, and a higher flexural rigidity of the rolling body guide can be realized by virtue of the fact that the rolling bodies are further away from the longitudinal axis and the rolling body guides can be at a greater radial spacing from one another.

It can preferably be provided that the polygonal cross section has connecting sides which are angled away relative to one another, a raceway being arranged between two connecting sides, preferably all the raceways being arranged in each case between two adjacent connecting sides. On the outside, the casing tube has a polygonal basic shape which is elongate in the longitudinal direction, preferably a triangular, rectangular, hexagonal or octagonal prismatic shape, in the case of which the connecting sides which are formed by way of the side faces are oriented parallel to secants of the envelope circle. The connecting sides lie in each case in side planes which intersect in an edge region which is situated in cross section in each case in the region of a corner. According to the invention, a raceway is preferably arranged in said corner or edge region between two connecting sides. As a result, a high deformation rigidity of the raceways can be produced which, in the case of an identical wall thickness of the casing tube, can be higher than in the case of anti-friction bearing guides which are arranged within the connecting sides. Furthermore, the installation space can be optimized by way of the arrangement in the edge regions.

In the case of the abovementioned embodiment, it is possible that at least one raceway is arranged on a raceway side which is arranged in an angled-away manner between connecting sides. A raceway face can be arranged in a similar manner to a chamfer, and extends parallel to the longitudinal axis in a raceway plane which is inclined with respect to the adjacent connecting sides. The raceway side can be at a radial spacing from the envelope circle at least in sections, and is offset radially inward relative to the latter, for example. As a result, it is possible for the rolling bodies to be positioned in an optimized manner in the edge region of the connecting sides which adjoin the raceway side, in order to produce a rigidity which is as high as possible.

The connecting sides and/or the raceway sides can preferably be of substantially planar configuration. Here, the connecting and/or raceway sides can form the outer side faces of a polygonal casing tube which lie in each case in connecting or raceway planes which are oriented parallel to secants of the envelope circle. The connecting and raceway sides can be arranged in a regular or irregular, symmetrical or asymmetrical manner. It can be advantageous that in each case two connecting sides or raceway sides lie opposite one another in parallel with regard to the longitudinal axis.

It can preferably be provided that the center points of rolling bodies which are arranged in adjacent raceways are at a transverse spacing of at least four times the rolling body radius perpendicularly with respect to the longitudinal axis. Said transverse spacing which corresponds to at least twice the rolling body diameter advantageously ensures support of transverse forces which act on the casing unit, which support is distributed over the circumference and is therefore homogenized.

It is advantageous that a plurality of rolling bodies are held in a rolling body cage such that they can be rotated about their center point. Balls or rollers can be used as rolling bodies, for example, in each case a plurality of rolling bodies being arranged in a raceway at a spacing in the longitudinal direction. A rolling body cage can be configured as a ball cage or roller cage, and serves to hold and guide a plurality of rolling bodies which are received in correspondingly configured receptacles such that they can be rotated freely about their rolling or roller axis. In the casing unit, it is arranged coaxially in the intermediate space between two casing tubes, with the result that the rolling bodies are positioned in the raceway cross section. In this way, a plurality of rolling bodies can be arranged in each case in rows, a plurality of rows preferably being arranged distributed over the circumference in a manner which corresponds to the arrangement of the raceways. A rolling body cage can be of tubular-closed configuration and can be inserted between the casing tubes coaxially with respect to the longitudinal axis, or can have separate segments in the circumferential direction.

It is one advantageous embodiment of the invention that the casing unit has at least three casing tubes which comprise at least one outer casing tube, one intermediate casing tube and one inner casing tube, with at least one intermediate casing tube which is arranged in the outer casing tube and in which the inner casing tube or a further intermediate casing tube is arranged, it being possible for rolling bodies to roll on the outside on at least one intermediate casing tube and the inner casing tube. In the case of a multiple telescope of this type, one or more intermediate casing tubes is/are inserted telescopically between an outer casing tube and an inner casing tube. As a result, a particularly great adjusting ratio between the maximum telescoped and the maximum extended adjusting position can be realized, as is advantageous, for example, in the case of steering columns which can be stowed for autonomous driving operation. In each case on their outer side, the inner casing tube and the intermediate casing tube or tubes have outer raceways which, in order to delimit the raceway cross section, lie radially opposite corresponding raceways which are arranged on the inside in the outer casing tube or else in a further intermediate casing tube. Accordingly, the inner casing tube and the intermediate casing tube or tubes can preferably be configured according to the invention. The increased rigidity, achieved as a result, of the rolling body bearing systems is particularly advantageous, in particular in the case of a multiple telescope, since the rigidity of the casing unit is influenced critically by the rigidity of the plurality of rolling body bearing systems. Here, a compact overall design can be realized, in particular by way of the above-described arrangement of the rolling bodies in the region of the edges.

In the abovementioned embodiment, it can preferably be provided that a first rolling body which is arranged on a first casing tube is at a mean spacing from a second rolling body which is arranged on a second casing tube, which mean spacing is smaller than or equal to four times the rolling body radius of the largest rolling body. By virtue of the fact that the mean or center point spacing between the rolling bodies of an inner and an outer (relative to the former) anti-friction bearing system which are arranged on the inside and the outside with regard to an intermediate casing tube is less than or equal to twice the rolling body diameter, particularly rigid support against one another can be produced. As a result, the rigidity of the casing unit can be increased.

A raceway can be configured as a channel-shaped formed recess. That cross section of a raceway which is depressed in the radial direction in a channel-shaped or groove-shaped manner can preferably be adapted to the shape and dimensions of the rolling bodies, in order to produce defined rolling of the rolling bodies in the concavely open cross section. A casing tube can be formed from a tubular profile, in which the raceways are made by way of cold forming, for example by way of rolling or pressing.

The casing tubes can preferably be manufactured from steel or from an aluminum alloy, and the rolling bodies can preferably be manufactured from rolling body steel such as, for example, 100Cr6 in accordance with DIN EN ISO 683-17.

It is necessary for a rigidity which is as high as possible that the rolling bodies have as low a bearing play (bearing clearance) as possible with respect to the raceways, and run in a virtual play-free manner. The bearing play is particularly preferably zero, so that the rolling bodies run in a play-free manner. Here, however, it has to be ensured that the rolling bodies can roll in a smooth-running and homogeneous manner over the entire adjusting range, and no excessively high adjusting force occurs, which can be caused by a bearing play which is too low even in sections. It is required here that a predefined adjusting force reference value is maintained within acceptable tolerances over the entire manufacture of a series, and the fluctuations over the adjusting range are also low. Therefore, in the prior art, the casing tubes and, in particular, the raceways have to be manufactured in a dimensionally accurate manner with narrow tolerances, which leads to a correspondingly high outlay, or the casing tubes have to be measured before assembly and have to be correspondingly fitted with rolling bodies of the matching geometric size during assembly. Here, for example, different classes of rolling bodies are provided which in each case have a diameter difference of 5 μm with respect to one another. This increases the cycle time and cycle rate during assembly, and is associated with high storage and logistics costs.

The abovementioned problem occurs in the case of steering columns with a roller-mounted casing unit, an optimized, low-play and at the same time smooth-running anti-friction bearing system being particularly important in the case of a steering column of the above-described overall design, in order for it to be possible for the advantages of the high rigidity according to the invention to be utilized in an optimum manner.

In order to solve the abovementioned problem, furthermore, the invention comprises a method for producing a steering column, comprising a casing unit, in which a steering spindle is mounted such that it can be rotated about a longitudinal axis which runs in the longitudinal direction, and which casing unit has at least two casing tubes which are guided such that they can be adjusted relative to one another in the longitudinal direction by a predefined adjusting travel, which casing tubes comprise an inner casing tube and an outer casing tube which have raceways which lie radially opposite one another and between which rolling bodies which have a predefined rolling cross section are arranged such that they can roll in the longitudinal direction, in the case of which method the adjusting force which is to be applied for the relative adjusting of the casing tubes is set to a predefined adjusting force reference value, comprising the steps:

A) providing of an inner casing tube, which has an outer raceway, and an outer casing tube, which has an inner raceway, the inner raceway and the outer raceway delimiting a raceway cross section transversely with respect to the longitudinal axis, B) providing of rolling bodies, the rolling cross section of which is greater than the raceway cross section, C) arranging of the rolling bodies in the raceway cross section, D) applying of an axial adjusting force for the relative movement of the casing tubes in the longitudinal direction over the entire adjusting travel, the rolling bodies deforming the raceways plastically, the adjusting force which is exerted in the process being measured along the adjusting travel, E) comparing of the measured adjusting force with an adjusting force reference value, F1) if the measured adjusting force coincides with the adjusting force reference value within predefined tolerance limits over the entire adjusting travel: end of the method.

F2) if the measured adjusting force is greater than the adjusting force reference value: further with step D).

It can be provided that, in step D, a transverse force and/or a torque are/is additionally introduced into the casing tubes. The direction of the transverse force is orthogonal with respect to the longitudinal direction. As a result, the method according to the invention can be improved further.

The method according to the invention makes the calibration of the rolling body bearing system to a predefined adjusting force reference value possible. It is particularly advantageous here that the requirements concerning the dimensional accuracy of the casing tubes which are provided initially for assembly are lower than is required for the freedom from play of the rolling body guides.

It is a special feature of the method according to the invention that the rolling bodies are utilized, beyond their principal bearing function, as manufacturing means, specifically as rolls in a cold rolling method for plastic forming of the raceways. Thanks to the method according to the invention, the raceways are adapted in an optimum manner to the rolling bodies after the method is carried out.

According to A) and B), casing tubes are first of all prefabricated, namely an inner casing tube and an outer (relative to the former) casing tube which can either be an outer casing tube or else an intermediate casing tube of a telescopic arrangement. Here, the raceways can delimit a raceway cross section in a manner which is subject to tolerances.

The rolling bodies, for example ball bearing balls, can be provided as industrial standard components with a high dimensional accuracy in the predefined dimensions.

The rolling bodies have a rolling cross section which denotes the rolling body cross section in the rolling direction transversely with respect to the longitudinal axis. Balls correspondingly have a circular rolling cross section with the ball diameter.

For steps C) and D), the casing tubes are first of all arranged coaxially with respect to the longitudinal axis at an axial spacing from one another, and are oriented relative to the longitudinal axis, with the result that inner and outer raceways which correspond with one another lie radially opposite one another. The rolling bodies are arranged axially between the casing tubes in the region of the raceway cross sections. By way of the application of an axial adjusting force, the casing tubes are moved toward one another in the longitudinal direction until the inner casing tube dips completely into the outer casing tube as far as the end of the adjusting travel, the rolling bodies being driven between the casing tubes in a frictionally locking manner.

By virtue of the fact that the rolling bodies have an oversize with respect to the raceway cross section, they bring about a plastic deformation of the raceways when the inner casing tube is dipped into the outer casing tube, in particular in the case of first-time rolling. As a result, the raceway cross section is widened. A lubricant, for example in the form of a grease, can preferably be provided between the rolling bodies and the raceway for the reduction of the friction and for the prevention of seizing between the rolling bodies and the respective raceway.

During the rolling, the adjusting force is measured which has to be applied in order to move the casing tubes relative to one another. Said adjusting force is considerably higher in the case of first-time rolling for the plastic deformation of the raceways on account of the deformation work which is to be performed in the process, than in the case of subsequent adjusting movements along the deformed raceways.

In the case of first-time rolling, the rolling bodies serve as rolls for cold forming of the raceways. This is possible without problems, since the balls or rollers made from rolling body steel are considerably harder than the material of the casing tubes, as a rule unhardened and untempered steel. Here, commercially available balls and rollers have a high surface quality and a low roughness, with the result that the surfaces of the raceways are cold formed with a correspondingly high surface quality. It is a further positive effect that structural work hardening is brought about in the region of the rolling faces of the raceways by way of the rolling by way of the rolling bodies, on which raceways the rolling bodies later roll during adjusting. Cold tempering of the raceways is produced.

While the casing tubes are moved relative to one another, the adjusting force is measured over the entire adjusting travel and is compared with a predefined adjusting force reference value. The adjusting force reference value corresponds to the adjusting force which has to be applied manually or by a motorized adjusting drive in order to set the steering column during driving operation. If the rolling bodies have an oversize with respect to the raceway cross section and, as a result, bring about cold forming, the adjusting force which is to be applied for movement purposes is higher as a result of the deformation work to be performed in the process than in the case of a play-free fit, in the case of which the rolling bodies only roll on the raceways.

The entire adjusting travel is to be understood to mean at least 90% of the maximum possible adjusting travel.

As long as, according to step F2), the measured adjusting force is greater than the adjusting force reference value, step D) is repeated. In step D), in each case a relative movement of the casing tubes in a forward direction and subsequently in an opposed reverse direction can preferably take place in each case over the entire adjusting travel. In the forward direction, the inner casing tube dips into the outer casing tube, with the result that telescoping takes place, and extending takes place in the reverse direction. A double stroke comprising in each case a movement in the forward and reverse direction over the entire adjusting travel can preferably be carried out in each case.

As soon as it is detected, according to step F1), that the measured adjusting force over the entire adjusting travel coincides with the adjusting force reference value within predefined tolerance limits, the casing unit is finally calibrated, and the method can be ended.

For application to multiple telescope arrangements, all the casing tubes can correspondingly be moved together with introduction of the rolling bodies in the longitudinal direction, all the raceways between the inner casing tubes, intermediate casing tubes and outer casing tubes being cold formed correspondingly.

It can be advantageous that the adjusting force which is measured in the forward direction is compared with the adjusting force which is measured in the reverse direction, and step D) is repeated until the measured adjusting forces in the forward and reverse direction coincide within predefined tolerance limits. This ensures that elastic springbacks which possibly occur during cold forming are compensated for.

If the measured adjusting force lies outside the adjusting force reference value even after a predefined number of movements, an error message can be output and the method can be terminated. If no coincidence with the adjusting force reference value can be achieved even after multiple running through the above-described calibration movements, there can be an excessively large dimensional deviation which cannot be compensated by way of the method according to the invention, or there is a material or manufacturing fault. Manufacturing and quality monitoring can therefore be realized with little outlay by way of monitoring of the adjusting force.

FIG. 1 shows a steering column 1 according to the invention in a view obliquely from the rear with regard to the driving direction, which steering column 1 has an actuating unit 2. The actuating unit 2 comprises a casing unit 3 which has an outer casing tube 31, an intermediate casing tube 32 and an inner casing tube 33. The casing tubes 31, 32 and 33 are arranged coaxially inside one another such that they can be displaced telescopically in the direction of a longitudinal axis L, as indicated by way of a double arrow.

A steering spindle 4 is mounted in the casing unit 3 such that it can be rotated about the longitudinal axis L, which steering spindle 4 has, at its rear end, a connector section 41 for the attachment of a steering wheel (not shown).

An adjusting drive 6 has a spindle drive with a spindle nut 61 and a threaded spindle 62 which is screwed therein, which can be driven rotationally relative to one another by an electric motor 63. The threaded spindle 62 extends parallel to the longitudinal axis L and is connected to the inner casing tube 33, and the spindle nut 61 is supported on the outer casing tube 31 in the longitudinal direction which corresponds to the axial direction of the longitudinal axis L. By way of a relative rotation by means of the motor 63, the threaded spindle 62 and the spindle nut 61 are moved together or apart from one another depending on the rotational direction, as a result of which the inner casing tube 33 is retracted into or extended from the outer casing tube 31 in the axial direction, as indicated by way of the double arrow. As a result, a longitudinal adjustment is realized, by way of which a steering wheel which is attached to the connector section 41 can be moved forward into a stowage position, in which the inner casing tube 33 and the intermediate casing tube 32 are retracted into the outer casing tube 31, that is to say are lowered forward.

As an alternative, the spindle nut 61 can be supported on the inner casing tube 33, and the threaded spindle 62 can be supported on the outer casing tube 31.

Figure 2:
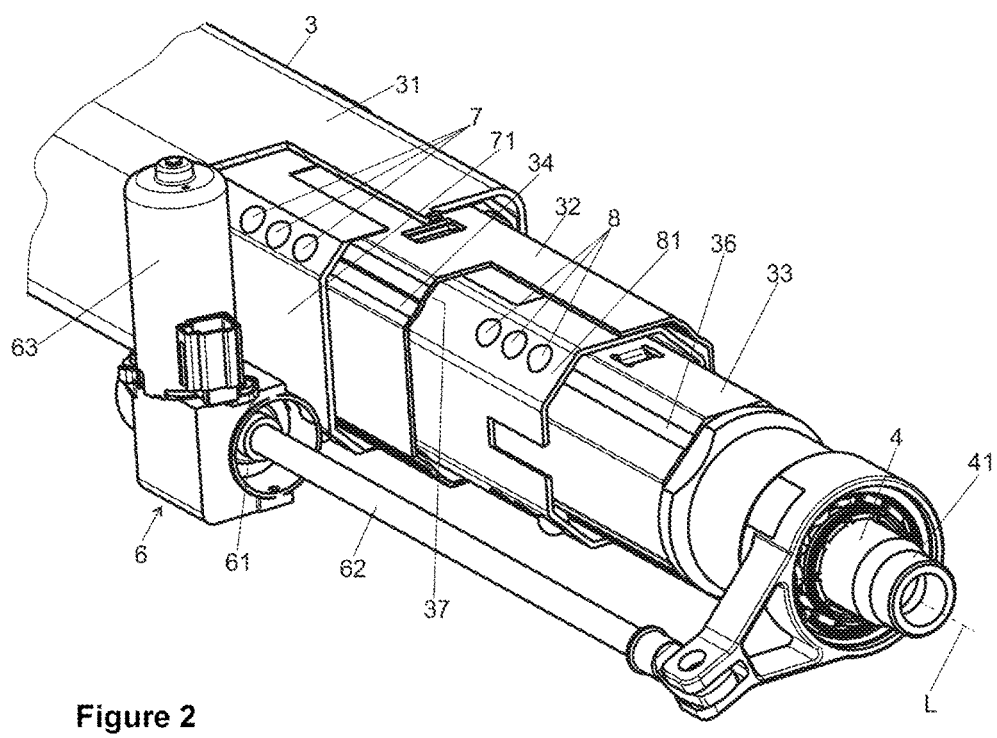
FIG. 2 is a diagrammatic partial interior view of the steering column according to FIG. 1.
Figure 3:
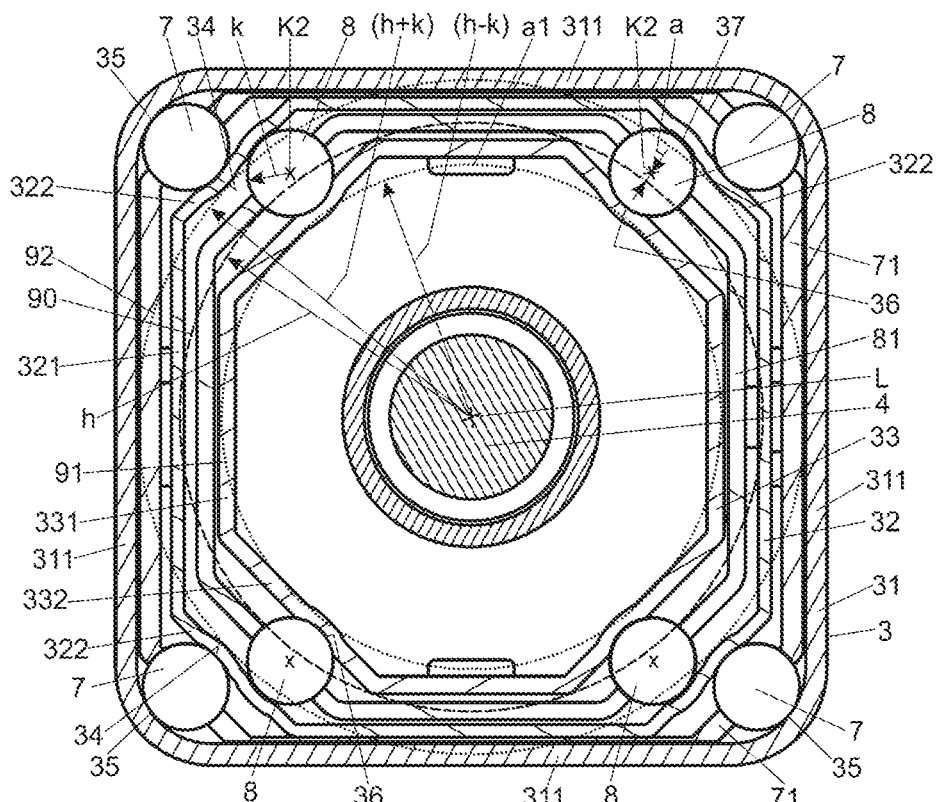
FIG. 3 is a cross-sectional view through the steering column according to FIG. 1.
Figure 4:
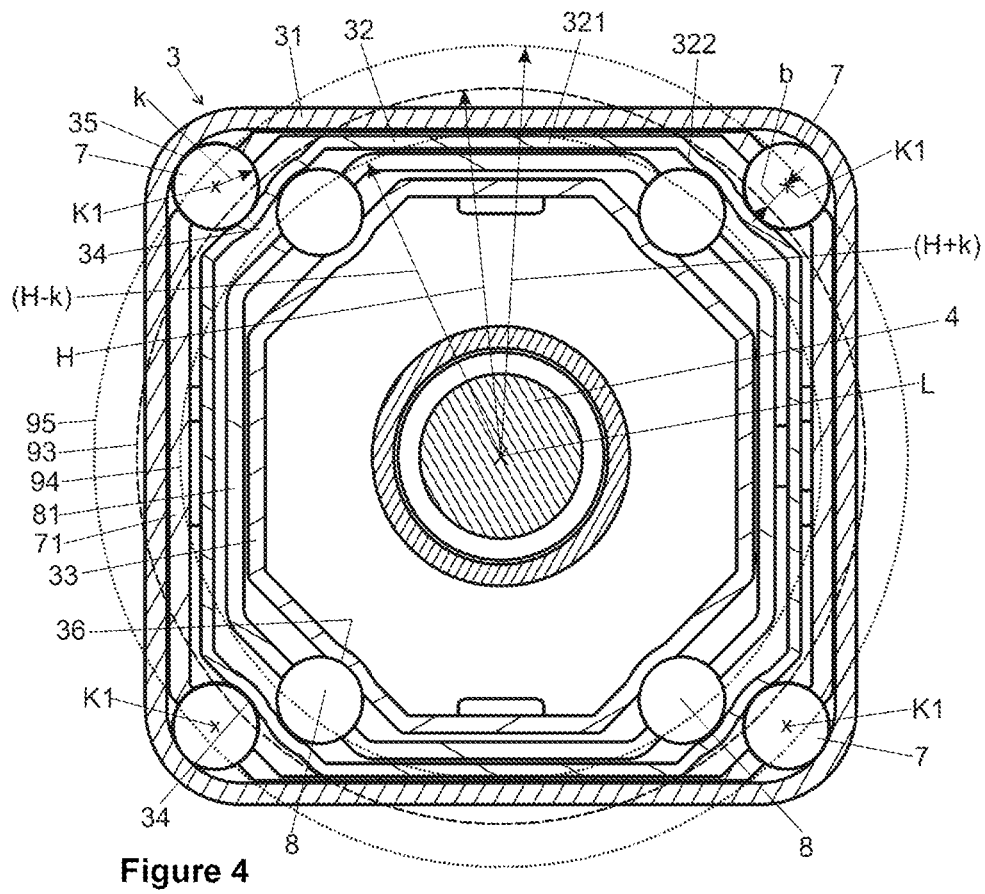
FIG. 4 is a further cross-sectional view through the steering column according to FIG. 1.

In FIG. 2, the outer casing tube 31 and the intermediate casing tube 32 are cut away and partially omitted. FIGS. 3 and 4 show the same cross section through the casing unit 3.

First balls 7 which form rolling bodies are received in a first ball cage 71 such that they can be rotated about their ball center points K1. The ball cage 71 is inserted coaxially between the outer casing tube 31 and the intermediate casing tube 32. The balls 7 are arranged such that they can roll between a groove-shaped or channel-shaped raceway 34, which is elongate parallel to the longitudinal axis L and is formed on the outside into the intermediate casing tube 32, and a likewise groove-shaped or channel-shaped raceway 35 which lies radially opposite the former and is configured on the inside in the outer casing tube 31.

Second balls 8 which form rolling bodies are received in a second ball cage 81 such that they can be rotated about their ball center points K2. The ball cage 81 is inserted coaxially between the intermediate casing tube 32 and the inner casing tube 33. Here, the balls 8 are arranged such that they can roll between a groove-shaped or channel-shaped raceway 36, which is elongate parallel to the longitudinal axis L and is formed on the outside into the inner casing tube 33, and a likewise groove-shaped or channel-shaped raceway 37 which lies radially opposite the former and is configured on the inside in the intermediate casing tube 32.

In each case a plurality of balls 7, 8 (three are visible in the view of FIG. 2) are arranged in a row in the longitudinal direction, that is to say in the direction of the longitudinal axis L. As can be seen in the cross sections of FIGS. 3 and 4, a total of four rows of balls 7, 8 are arranged distributed around the longitudinal axis L in the example which is shown.

In the example which is shown, the balls 7 and 8 are of equal size with a ball radius k, that is to say a ball diameter 2k.

The inner casing tube 33 and the intermediate casing tube 32 have an octagonal cross section. They have connecting sides 321 and 331 which are arranged in each case at a right angle with respect to one another and in each case lie opposite one another in pairs in parallel with regard to the longitudinal axis L. Raceway sides 322 and 332 are arranged in the corner or edge regions between the connecting sides 321 and 331. The raceway sides 332 have the raceways 36, and the raceway sides 322 have the raceways 34. The raceway sides 322 and 332 are inclined in each case with respect to the adjacent connecting sides 321 and 331, and are angled away by approximately 45° in a symmetrical arrangement in the example which is shown.

The raceways 36 are formed on the outside into the raceway sides 332 in the inner casing tube 33, and the raceways 34 are formed on the outside into the raceway sides 322 of the intermediate casing tube 32.

The raceway sides 322 of the intermediate casing tube 32 have, on the inside, the raceways 37 which correspond with the raceways 36 and delimit a raceway cross section, in which the balls 8 are received.

A raceway side 322 of the intermediate casing tube 32 is preferably parallel to a raceway side 332 of the inner casing tube 33.

The outer casing tube 31 has a rectangular cross section which has four connecting sides 311 which are arranged at a right angle and are connected to one another in the corner or edge regions. The raceways 35 which have a rounded, channel-shaped cross section are situated on the inside in the edge regions.

In FIG. 3, an envelope circle 90 is illustrated using dashed lines, which envelope circle 90 encloses the inner casing tube 33 and is tangent on the corner regions between the connecting sides 331 and the raceway sides 332. The envelope circle 90 has an envelope circle radius h.

The circularly annular optimum region according to the invention around said envelope circle 90 is delimited by way of an inner circular limit 91 with the radius (h−k), k being the ball radius, and an outer circular limit 92 with the radius (h+k). The inner and outer circular limits 91, 92 are preferably concentric with respect to the envelope circle 90. In other words, the center points of the envelope circle 90 and of the inner and outer limit 91, 92 coincide and lie on the longitudinal axis L.

According to the invention, the ball center points K2 of the balls 8 are situated within the optimum region. In the example which is shown, they are spaced apart here by a spacing a radially to the outside from the envelope circle 90, the spacing a being less than or equal to the ball radius k.

In FIG. 4, an envelope circle 93 is illustrated using dashed lines, which envelope circle 93 encloses the intermediate casing tube 32 and is tangent on the corner regions between the connecting sides 321 and the raceway sides 322. The envelope circle 93 has an envelope circle radius H.

The circularly annular optimum region according to the invention around said envelope circle 93 is delimited by way of an inner circle 94 with the radius (H−k), k being the ball radius of the balls 7, and an outer circle 95 with the radius (H+k).

According to the invention, the ball center points K1 of the balls 7 are situated within the optimum region. In the example which is shown, they are spaced apart here by a spacing b radially to the outside from the envelope circle 93, which spacing b is smaller than or equal to the ball radius k.

Figure 5:
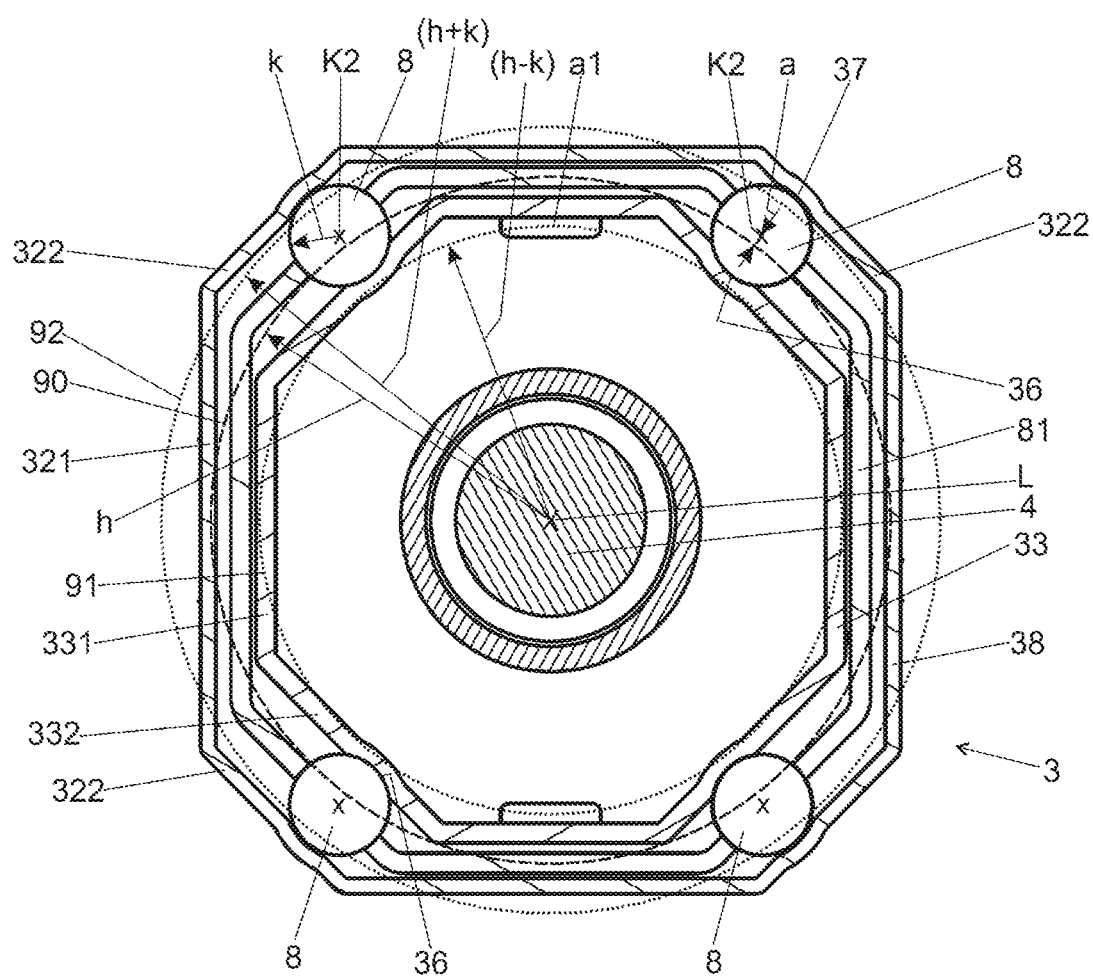
FIG. 5 is a cross-sectional view through another example steering column.

FIG. 5 shows a casing unit 3 which comprises only an inner casing tube 33 and an outer casing tube 38. The outer casing tube 38 is of similar construction to the intermediate casing tube 32 of the first embodiment according to FIGS. 3 and 4, and is provided with the same designations, but, in contrast to the latter, does not have any raceways on the outside. Here too, the balls 8 are arranged, as described above, in an optimum region around the envelope circle 90 which circumscribes the inner casing tube 33.

Figure 6:
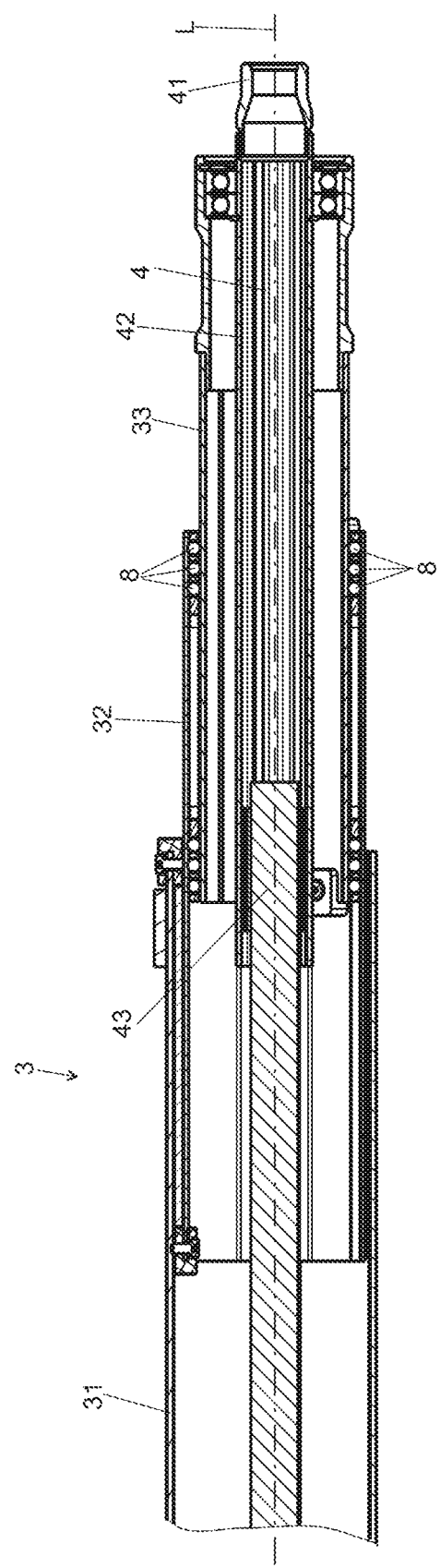
FIG. 6 is a longitudinal sectional view (along a longitudinal axis) through an example steering column.

It can be gathered from the longitudinal section shown in FIG. 6 along the longitudinal axis L that the steering spindle 4 is likewise of telescopic configuration, with an inner shaft 43 which can telescope in the longitudinal direction and engages in a positively locking manner into an outer shaft 42, it being possible for a torque-transmitting linear bearing system which is mounted using plain bearings or anti-friction bearings to be inserted in between.

The spacing of the ball center points K1 and K2 from one another is smaller than or equal to twice the ball diameter (2 k), that is to say four times the ball radius k.

LIST OF DESIGNATIONS

1 Steering column
2 Actuating unit
3 Casing unit
31, 38 Outer casing tube
32 Intermediate casing tube
321 Connecting side
322 Raceway side
33 Inner casing tube
331 Connecting side
332 Raceway side
34, 35 Raceways
36, 37 Raceways
4 Steering spindle
41 Connector section
42 Outer shaft
43 Inner shaft
5 Supporting unit
51 Fastening means
6 Adjusting drive
61 Spindle nut
62 Threaded spindle
63 Motor
7, 8 Balls
71, 81 Ball cage
90, 93 Envelope circle
91, 92 Limit
94, 95 Limit
K1, K2 Ball center point
k Ball radius
L Longitudinal axis
H, h Radius
a Spacing
b Spacing

What is claimed is:

1. A steering column for a motor vehicle, the steering column comprising:
   a casing unit in which a steering spindle is mounted rotatably about a longitudinal axis that extends in a longitudinal direction, wherein the casing unit includes at least two casing tubes that have a polygonal cross section and are guided such that the at least two casing tubes are adjustable relative to one another in the longitudinal direction; and
   rolling bodies, which have a rolling body radius, disposed between the at least two casing tubes such that the rolling bodies are configured to roll in the longitudinal direction in at least three raceways distributed circumferentially on an outside of at least one of the at least two casing tubes,
   wherein center points of the rolling bodies are at a radial spacing that is less than or equal to the rolling body radius from an envelope circle that circumscribes the at least one of the at least two casing tubes on which the rolling bodies are configured to roll;
   wherein the casing unit includes at least three casing tubes that comprise an outer casing tube, an intermediate casing tube, and an inner casing tube, with the intermediate casing tube being disposed in the outer casing tube and the inner casing tube being disposed in the intermediate casing tube, wherein the rolling bodies are configured to roll on outsides of the intermediate casing tube and the inner casing tube;
   wherein a first rolling body of the rolling bodies that is disposed on a first casing tube of the at least two casing tubes is at a mean spacing from a second rolling body of the rolling bodies that is disposed on a second casing tube of the at least two casing tubes, wherein the mean spacing is less than or equal to four times the rolling body radius of a largest rolling body of the rolling bodies.

2. The steering column of claim 1 wherein the center points of the rolling bodies are located outside the envelope circle.

3. The steering column of claim 1 wherein the polygonal cross section has connecting sides that are angled away relative to one another, wherein a first of the at least three raceways is disposed between a first and a second of the connecting sides.

4. The steering column of claim 3 wherein the first raceway is disposed on a raceway side that is located in an angled-away manner between the first and second connecting sides.

5. The steering column of claim 4 wherein at least one of the raceway side or the connecting sides are planar.

6. The steering column of claim 1 wherein the center points of rolling bodies that are disposed in adjacent of the at least three raceways are at a transverse spacing of at least four times the rolling body radius perpendicularly with respect to the longitudinal axis.

7. The steering column of claim 1 wherein a plurality of the rolling bodies are held in a rolling body cage such that the plurality of rolling bodies are rotatable about their respective center points.

8. The steering column of claim 1 wherein at least one of the at least three raceways is a channel-shaped recess.

9. The steering column of claim 1 wherein a motorized adjusting drive is connected to the at least two casing tubes.

\* \* \* \* \*